US008824528B2

(12) United States Patent
Ban et al.

(10) Patent No.: US 8,824,528 B2
(45) Date of Patent: Sep. 2, 2014

(54) APPARATUS AND METHOD FOR DETECTING SPECTRUM INVERSION

(71) Applicant: FCI Inc., Gyeonggi-Do (KR)

(72) Inventors: Jae-Jun Ban, Gyeonggi-Do (KR); Beomjin Kim, Gyeonggi-Do (KR)

(73) Assignee: FCI Inc., Gyeonggi-do (KR)

( * ) Notice: Subject to any disclaimer, the term of this patent is extended or adjusted under 35 U.S.C. 154(b) by 0 days.

(21) Appl. No.: 13/914,650

(22) Filed: Jun. 11, 2013

(65) Prior Publication Data

US 2013/0329770 A1 Dec. 12, 2013

(30) Foreign Application Priority Data

Jun. 12, 2012 (KR) .................. 10-2012-0062690

(51) Int. Cl.
*H04B 1/00* (2006.01)
*H04B 1/7163* (2011.01)

(52) U.S. Cl.
CPC .................................. *H04B 1/71637* (2013.01)
USPC ............................ 375/150; 375/140; 375/147

(58) Field of Classification Search
USPC ...................................................... 375/150
See application file for complete search history.

(56) References Cited

U.S. PATENT DOCUMENTS

| 7,463,699 | B2 * | 12/2008 | Zhang et al. ................... 375/316 |
| 8,306,156 | B2 * | 11/2012 | Zhang ............................ 375/329 |
| 8,537,939 | B2 * | 9/2013 | Kawauchi et al. ............. 375/343 |
| 2006/0098751 | A1 * | 5/2006 | Zhang et al. ................... 375/260 |
| 2009/0103633 | A1 * | 4/2009 | Zhang ....................... 375/240.26 |
| 2011/0142098 | A1 * | 6/2011 | Kawauchi et al. ............. 375/147 |
| 2013/0318557 | A1 * | 11/2013 | Cheng et al. ..................... 725/70 |

* cited by examiner

*Primary Examiner* — Erin File
(74) *Attorney, Agent, or Firm* — Mark M. Friedman (57) ABSTRACT

The present invention relates to a spectrum inversion detection apparatus which includes a differential correlation value computing portion, utilized to use a present and previous time axial symbols to compute differential correlation values individually corresponding to carriers; and a controlling portion, utilized to use the differential correlation values, when a spectrum inversion status flag is not at a spectrum inversion state, to compute a correlativity value of the each integer frequency displacement thereby, and when spectrum inversion status flag is at the spectrum inversion state, to determine a maximal correlativity value among all the computed correlativity values, and to decide a spectrum inversion status flag of the computed correlativity value which is determined as the maximal correlativity value thereby utilizing as a detection result signal to output.

11 Claims, 6 Drawing Sheets

APPARATUS AND METHOD FOR DETECTING SPECTRUM INVERSION

FIELD OF THE INVENTION

The present invention relates to an apparatus and method for detecting spectrum inversion.

BACKGROUND OF THE INVENTION

In general, orthogonal frequency-division multiplexing (OFDM) is widely used in a digital audio broadcasting (DAB) receiver and a digital television; digital transmission technology of wireless local area network (WLAN), wireless asynchronous transfer mode (WATM), and so on.

Such OFDM makes a data column with a high transfer rate be divided into multiple data columns with a lower transfer rate, and multiple sub-carriers are employed to simultaneously transmit the data columns. Moreover, each of the sub-carriers keeps orthogonality to each other.

In OFDM, a reference signal is a signal for time or frequency synchronization, which is utilized as a criterion for data transmission of a pilot signal. Meanwhile, in the pilot signals, a pilot signal with a power larger than the information carrier of the data is called a boosted pilot signal (hereinafter referred to as boosted pilot signal). Such boosted pilot signal has a continual pilot signal (CP signal) used in a digital broadcasting signal of DVB-terrestrial (DVB-T), DVB-handheld (DVB-H), integrated services digital broadcasting-terrestrial (ISDB-T), etc. and a scattered pilot signal (SP signal).

The receiver, which uses this transmission criterion, utilizes the continual pilot signal and the scattered pilot signal to perform an integral frequency synchronization.

When a transmitter transmits data to the receiver, due to abnormal actions of the transmitter, or error actions which an I signal (time domain In-phase signal) and a Q signal (Quadrature phase signal) of the receiver having a phase difference of 90° therebetween are exchanged and then the receiver is coupled, a phenomenon of a spectrum inversion will occur.

However, under a condition that a receiver side employs the signal which occurs the spectrum inversion phenomenon to perform a signal processing such as a fast Fourier transform (FFT) and then a transmitter side repairs the transmitted data, a problem that normal data can not be output due to the repair of abnormal data will occur.

Therefore, in order to perform suitable signal processing according to whether the spectrum inversion phenomenon occurs after detecting the spectrum inversion phenomenon, the receiver side will detect whether the spectrum inversion phenomenon occurs.

One example for detecting the spectrum inversion phenomenon can utilize frequency axial differential correlation and the reference signal, such as a pseudo random binary sequence (PRBS) signal.

SUMMARY OF THE INVENTION

Technical Problem

Accordingly, an objective of the present invention is to provide a spectrum inversion detection apparatus and method which are capable of automatically detecting the spectrum inversion phenomenon and increasing a receiving performance of an OFDM.

Technical Solution

The spectrum inversion detection apparatus according to one embodiment of the present invention includes: a differential correlation value computing portion, after a present time axial symbol having a plurality of carriers is input, utilized to use the present time axial symbol and a previous time axial symbol to compute a plurality of differential correlation values individually corresponding to the carriers; a controlling portion, utilized to use the differential correlation values computed by the differential correlation value computing portion, when a spectrum inversion status flag is not at a spectrum inversion state, to compute a sum of the differential correlation values of all pilot signals of the present time axial symbol through each integer frequency displacement within an integer frequency offset variation region, and to compute a correlativity value of the each integer frequency displacement thereby, and when spectrum inversion status flag is at the spectrum inversion state, after computing the sum of the differential correlation values of the all pilot signals of the present time axial symbol through the each integer frequency displacement within the integer frequency offset variation region, and after computing the correlativity value of the each integer frequency displacement thereby, to determine a maximal correlativity value among all the computed correlativity values, and to decide a value of the spectrum inversion status flag of the computed correlativity value which is determined as the maximal correlativity value thereby utilizing as a detection result signal, which is utilized to determine whether it is spectrum inversion or not, to output.

The sum of the differential correlation values is computed by a following equation: sum=sum+$[C_n(D+K \times INV)]$ wherein sum is the sum of the differential correlation values, wherein D is a displacement of the integer frequency offset, wherein K is a carrier location information of the pilot signal, wherein INV is a value of the spectrum inversion status flag, and wherein n is a location information of the time axial symbol.

Preferably, the spectrum inversion status flag has the value of either '1' or '−1'. The spectrum inversion status flag is indicative of a spectrum non-inversion status when the value of the spectrum inversion status flag is '1'. The spectrum inversion status flag is indicative of a spectrum inversion status when the value of the spectrum inversion status flag is '−1'.

The differential correlation value computing portion includes: a memory, utilized to store a present data which is utilized as a previous data and to regard the present data as the previous data, and to output a stored data, which is utilized as a previous data, before the storage; a complex conjugate computing portion, utilized to find a complex conjugate of the previous data output by the memory, thereby output the complex-conjugated previous data; and a multiplier, utilized to receive the present data and the complex-conjugated previous data, and to compute the differential correlation value of each of the carriers by using the present data and the complex-conjugated previous data.

The controlling portion includes: a register, utilized to store the differential correlation value of each of the carriers output from the multiplier; a pilot location information storing portion, utilized to store carrier location information corresponding to the all pilot signals.

The controlling portion determines the integer frequency displacement of the correlativity value which is determined as the maximal correlativity value, thereby utilizing as the detection result signal to be output.

Preferably, the pilot signals are continual pilot signals.

The spectrum inversion detection method according to one embodiment of the present invention includes: setting a spectrum inversion status flag to a spectrum non-inversion status; when the spectrum inversion status flag is at the spectrum non-inversion status, reading corresponding differential correlation values of all pilot signals within a present time axial symbol for each integer frequency offset displacement in an integer frequency offset variation region from a register, adding the corresponding differential correlation values of the all pilot signals and thereby assigning a sum of the differential correlation values, squaring a real part of the sum of the differential correlation values and squaring an imaginary part thereof, then adding the squares of the real part and the imaginary part to compute a correlativity value, and determining a maximal correlativity value among all the computed correlativity values; setting the spectrum inversion status flag to a spectrum inversion status; when the spectrum inversion status flag is at the spectrum inversion status, reading corresponding differential correlation values of all pilot signals within a present time axial symbol for each integer frequency offset displacement in an integer frequency offset variation region from a register, adding the corresponding differential correlation values of the all pilot signals and thereby assigning a sum of the differential correlation values, squaring the real part of the sum of the differential correlation values and squaring the imaginary part thereof, then adding the squares of the real part and the imaginary part to compute the correlativity value, and determining the maximal correlativity value among the all the computed correlativity values; and outputting the corresponding integer frequency offset displacement and the spectrum inversion state status flag, wherein the maximal correlativity value is a largest correlativity value among the all computed correlativity values when the spectrum inversion status flag is at the spectrum non-inversion status and when the spectrum inversion status flag is at the spectrum inversion status.

Preferably, the sum of the differential correlation values is computed by a following equation: $sum=sum+[C_n(D+K\times INV)]$ wherein sum is the sum of the differential correlation values, wherein D is a displacement of the integer frequency offset, wherein K is a carrier location information of the pilot signal, wherein INV is a value of the spectrum inversion status flag, and wherein n is a location information of the time axial symbol.

Preferably, the spectrum inversion status flag has the value of either '1' or '−1'. The spectrum inversion status flag is indicative of the spectrum non-inversion status when the value of the spectrum inversion status flag is '1'. The spectrum inversion status flag is indicative of the spectrum inversion status when the value of the spectrum inversion status flag is '−1'.

Preferably, the pilot signals are continual pilot signals.

Advantageous Effects

As mentioned above, whether it is at the spectrum inversion state or not can be known by using the differential correlation values of the pilot signals, so the generator which generates the PRBS signal is not required. Accordingly, the structure of the spectrum inversion detection apparatus becomes simple.

Moreover, in addition to knowing whether the spectrum inversion occurs or not, the quantity of the frequency offset also can be simultaneously known. Thus, an individual action for detecting the quantity of the frequency offset is not required. The demodulator considers not only whether the spectrum inversion occurs but also the quantity of the frequency offset for performing the demodulation. Therefore, the demodulation of data is more accurately implemented, thereby enhancing the receiving performance of the receiver.

DESCRIPTION OF THE DRAWINGS

FIGS. 6 (a) to (c) are schematic drawings illustrating relations of an integer frequency offset displacement (D), a spectrum inversion status flag (INV), and a correlativity value (C_Pow) in detecting spectrum inversion according to one preferred embodiment of the present invention.

DETAILED DESCRIPTION OF THE PREFERRED EMBODIMENTS

Hereinafter, exemplary embodiments of the present invention will be described in detail with reference to the accompanying drawings. The person skilled in the art will appreciated that the drawing is provided as an example in order to notify a scope of the present invention sufficiently. Therefore, the present invention is not limited to the drawing indicated below, but can be embodied in other forms. At this time, provided that technological terms and science terms used herein do not contain another definition, it is noted that the man skilled in the art typically understands them. The description on the known function and structure which unnecessarily make unclear the subject matter of the present invention will be omitted.

The spectrum inversion detection apparatus and method of one embodiment of the present invention will be described in detail with reference to the accompanying drawings First, referring to FIG. 1, a receiver which has the spectrum inversion detection apparatus according to one embodiment of the present invention will be explained in detail.

The spectrum inversion detection apparatus according to the embodiment of the present invention includes a receiver which used for receiving digital signals through a wireless manner.

Figure 1:
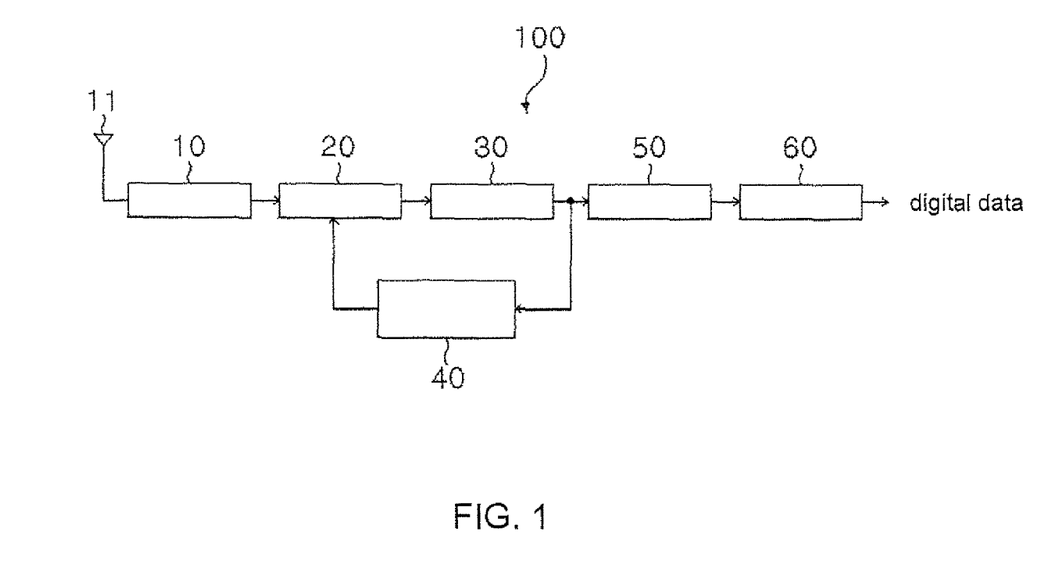
FIG. 1 is a brief block diagram illustrating a receiver according to one preferred embodiment of the present invention.

As shown in FIG. 1, the receiver 100 in accordance with the embodiment of the present invention has: a radio frequency (RE) module portion which receives digital signals such as digital broadcasting signals, etc. via an antenna 11; a demodulator 20 coupled to the RF module portion 10; a fast Fourier transform (FFT) portion 30 (hereinafter referred to as FFT portion) coupled to the demodulator 20; a spectrum inversion detection apparatus 40 coupled to the demodulator 20 and the FFT portion 30; an equalizer 50 coupled to the FFT portion 30; and a decoder 60 coupled to the equalizer 50.

The RF module portion 10 may include an analog-to-digital converter which converts an analog signal received via the antenna 11 into a digital signal, and a receive (Rx) filter which extracts the signal in a utilize band from the converted digital signal to perform the filtering.

Accordingly, the analog signal, which is input into the RF module portion 10 via the antenna 110, is converted into digital signal through the RF module portion 10. After extracting, the signal within the desired band of the digital signal is applied to the demodulator 20.

Meanwhile, because the signal received in the receiver 100 is the modulated signal by using a carrier, the demodulator 20 demodulates the digital signal, which is applied by the RF module portion 10, into the original signal.

The demodulated digital signal by the demodulator 20 is input into the FFT portion 30, and is processed by the FFT via the FFT portion 30. Meanwhile, such as the technique being widely known by the person skilled in the art, the action of the FFT in the FFT portion 30 is to transform a time-axis symbol within a time domain of the transmission into a frequency domain; thus, the detail action of the FFT in the embodiment is omitted.

The signal processed by the FFT portion 30 is applied to the spectrum inversion detection apparatus 40, thereby detecting whether the spectrum inversion of the FFT processed signal occurs or not. Then a detection result signal (DIS) is output to the demodulator 20 again.

As a result, the demodulator 20 utilizes the data of the detection result signal (DIS) which is applied by the spectrum inversion detection apparatus 40 and performs a suitable demodulating process according to whether the spectrum inversion of the FFT processed signal occurs or not, and then outputs the demodulated signal to the FFT portion 30.

Therefore, under a condition that the spectrum inversion occurs, the demodulator 20 performs the suitable demodulation, such as compensating the spectrum inversion, which compensates the action that the signal of the spectrum inversion is input into the FFT portion 30. Therefore, after the FFT portion 30 performs the FFT for the normal signal without the spectrum inversion, the FFT portion 30 outputs the FFT processed signal to the equalizer 50.

Hereinafter, a structure and detecting actions of the spectrum inversion detection apparatus 40 according to the embodiment will be explained in detail.

The equalizer 50 compensates a distortion included in the signal which is applied by the FFT portion 30 and then outputs the compensated signal to the decoder 60.

The decoder 60 decodes the signal which the distortion is compensated and applied by equalizer 50, and outputs to an external device by digital data.

Meanwhile, the decoder 60 can be implemented by a viterbi decoder, a Reed Solomon (RS) decoder, etc.

The digital data that is output from the decoder 60 can be processed in the external device by a signal processing and so on and can generate the signal that is used for video or audio.

Subsequently, referring to FIG. 2 and FIG. 3, the drawings illustrate the structure and the actions of the spectrum inversion detection apparatus 40 according to one embodiment of the present invention.

Figure 2:
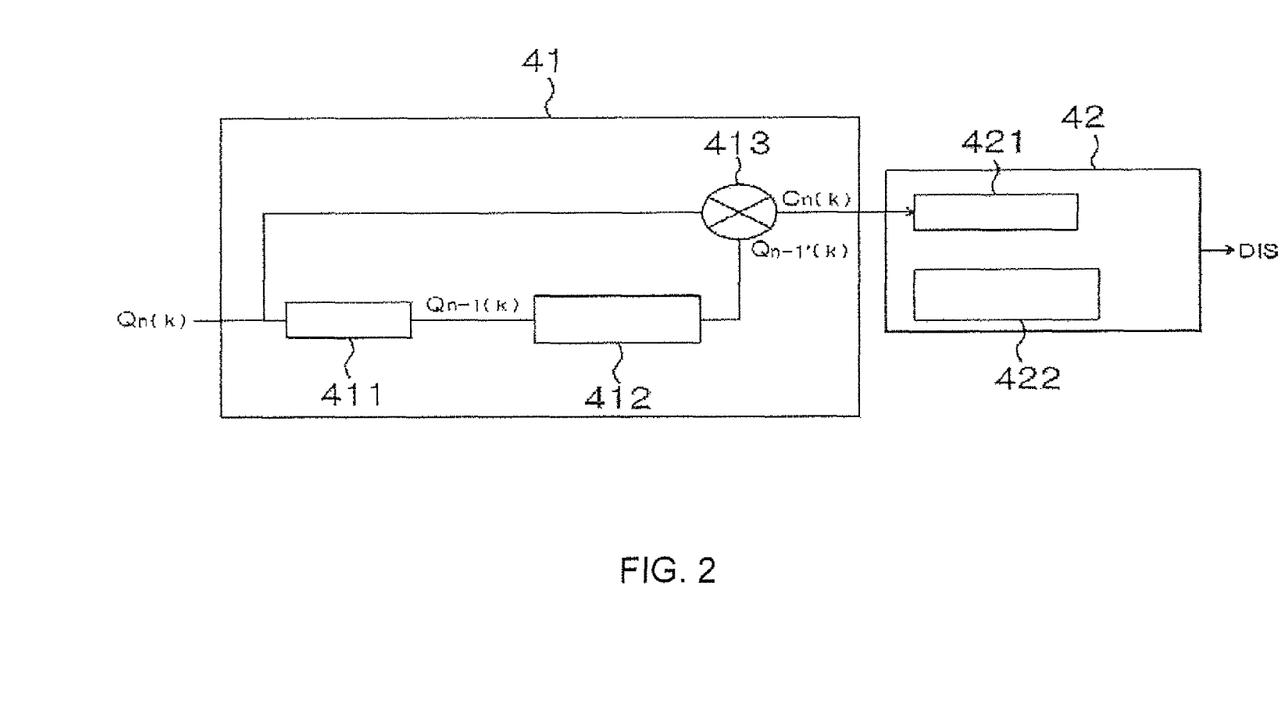
FIG. 2 is a block diagram illustrating a spectrum inversion detection apparatus according to one preferred embodiment of the present invention.

First, as shown in FIG. 2, the spectrum inversion detection apparatus 40 according to the embodiment of the present invention has a differential correlation value computing portion 41 and a controlling portion 42 which is coupled to the differential correlation value computing portion 41.

Figure 4:
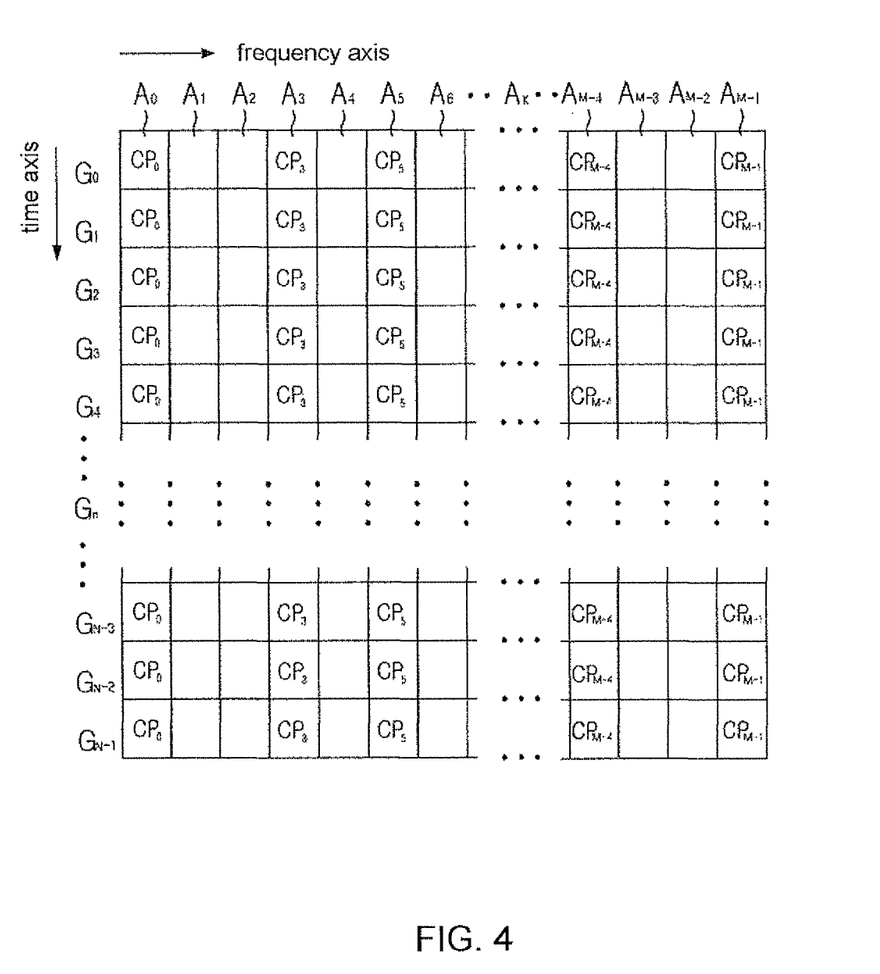
FIG. 4 is a schematic drawing illustrating an OFDM frame according to one preferred embodiment of the present invention.

When transmitting data from a transmitter side to a receiver side by means of the OFDM, the data will be transmitted in units of a frame. As shown in FIG. 4, one frame (i.e. OFDM frame) has multiple time-axis symbols ($G_0$~$G_{N-1}$), and each of the time-axis symbols ($G_0$~$G_{N-1}$) consists of multiple carriers ($A_0$~$A_{M-1}$) of correlative information of data or reference signals.

In the following, $Q_n(K)$ is designated as the data of k-th carrier ($A_k$) within the n-th time-axis symbol.

Therefore, the differential correlation value computing portion 41 has: a memory 411 is utilized to store data [$Q_n(k)$] (hereinafter referred to as 'present data') of the k-th carrier within the present (e.g. (n)-th) inputted time-axis symbol (hereinafter referred to as 'present time-axis symbol') ($G_n$) which is utilized as data [$Q_{n-1}(k)$] (hereinafter referred to as 'present data') of the k-th carrier within the previous (e.g. (n−1)-th) inputted time-axis symbol (hereinafter referred to as 'previous time-axis symbol') ($G_{n-1}$), and to output a stored data [$Q_{n-1}(k)$], which is utilized as a previous data [$Q_{n-1}(k)$], before the storage that the present data [$Q_n(k)$] is utilized as the previous data; a complex conjugate computing portion 412 is utilized to receive the previous data [$Q_{n-1}(k)$] outputted from the memory 411 and to perform a complex conjugate operation [conjugate( )] to output; and a multiplier 413 is utilized to receive the present data [$Q_{n-1}(k)$] and the previous data after the complex conjugate operation (hereinafter referred to as 'complex-conjugated previous data') [$Q_{n-1}'(k)$], and to compute the differential correlation value [$C_n(k)$].

As the explanation mentioned above, n is a time identification information of the received time-axis symbol, and k is carrier location information of the time axial symbol. In the embodiment, all of N, n, M and k are integers.

The controlling portion 42 has a register 421 is utilized to store the differential correlation values [$C_n(k)$] that are sequentially applied from the differential correlation value computing portion 41; and a pilot location information storing portion 422 is utilized to store the carrier location information corresponding to the pilot signals, and to output the detection result signal (DIS) representing whether the spectrum inversion phenomenon occurs to the demodulator 20.

Accordingly, when the present time-axis symbol ($G_n$) processed by the FFT operation in the FFT portion 40 is applied to the differential correlation value computing portion 41 of the spectrum inversion detection apparatus 40, the present time-axis symbol ($G_n$) is utilized as the data [$Q_{n-1}(k)$] of the previous time-axis symbol corresponding to each carrier (k) and is stored in the memory 411 when the present time-axis symbol ($G_n$) is sequentially utilized as the present data [$Q_n(k)$] according to sorts of each of the carriers k. Meanwhile, the data [$Q_{n-1}(k)$], which is originally utilized as the previous data and stored in the memory 411, is utilized as the previous data [$Q_{n-1}(k)$] and is output to the complex conjugate computing portion 412.

Accordingly, the complex conjugate computing portion 412 performs the complex conjugate operation for the data [$Q_{n-1}(k)$] in a complex number type which is stored in k-th carrier of the previous time-axis symbol ($G_{n-1}$). That is, after the sign of an imaginary part is inverted, the value of the complex-conjugated previous data [$Q_{n-1}'(k)$] is output to the multiplier 413.

Accordingly, after the multiplier 413 calculates the value of k-th carrier data [$Q_n(k)$] stored in the present time-axis symbol ($G_n$) multiplied by the value of the data [$Q_{n-1}'(k)$] of the complex-conjugated k-th carrier stored in the previous time-axis symbol ($G_{n-1}$) to obtain the differential correlation value [$C_n(k)$], the differential correlation value [$C_n(k)$] is stored in a corresponding address of the register 421 of the controlling portion 42.

For example, if the value of the data [$C_n(k)$] stored in the k-th carrier of the present time-axis symbol ($G_n$) is (1+j), and if the value of the data [$Q_{n-1}(k)$] stored in the k-th carrier of the previous time-axis symbol ($G_{n-1}$) is (1+j), the differential correlation value [$C_n(k)$] that is calculated by the multiplier 413 is '2'.

By the action of the aforesaid differential correlation value computing portion 41, the corresponding differential correlation values of the corresponding data of each carrier of the present time-axis symbol ($G_n$) and the previous time-axis symbol ($G_{n-1}$) will be computed according to a location order of the carriers and then be stored in the corresponding addresses of the register 421.

Subsequently, the controlling portion 42 of the spectrum inversion detection apparatus 40 determines whether the present applied time-axis symbol ($G_n$) occurs the spectrum inversion by using the differential correlation value [$C_n(k)$] stored in the register 421 and the location information of the pilot signals stored in the pilot location information storing portion 422.

The pilot signal location information that is stored in the pilot location information storing portion 422 is the information which is stored during manufacturing the controlling portion 42. Thus, the controlling portion 42 is capable of understanding the location information of the all pilot signals located at the OFDM frame by using the pilot location information storing portion 422.

In the embodiment, the pilot signals can be boosted pilot signals such as continual pilot signals, but not limited to be those. It can be a general pilot signal, and can be not only the continual pilot signal but also a scattered pilot signal. Moreover, the signals can only be the scattered pilot signals instead of the scattered pilot signals.

Subsequently, referring to FIG. 3, the drawing illustrates the actions of the controlling portion 42 for detecting whether the spectrum inversion occurs or not.

First, when the actions of the controlling portion 42 begin at step S10, the controlling portion 42 of the spectrum inversion detection apparatus 40 performs actions on an assumption that no spectrum inversion occurs.

Accordingly, at step S13, the controlling portion 42 stores a value of the spectrum inversion status flag (INV), which represents whether the spectrum inversion occurs or not, as '1'.

In the embodiment, the value of the spectrum inversion status flag (INV) can be either '1' or '−1'. When the value of the spectrum inversion status flag (INV) is '1', it represents a spectrum non-inversion status that no spectrum inversion occurs. When the value of the spectrum inversion status flag (INV) is '−1', it represents a spectrum inversion status that the spectrum inversion occurs. However, whether the spectrum inversion occurs or not also can be indicative of an opposite definition for the value of the spectrum inversion status flag (INV).

Figure 3:
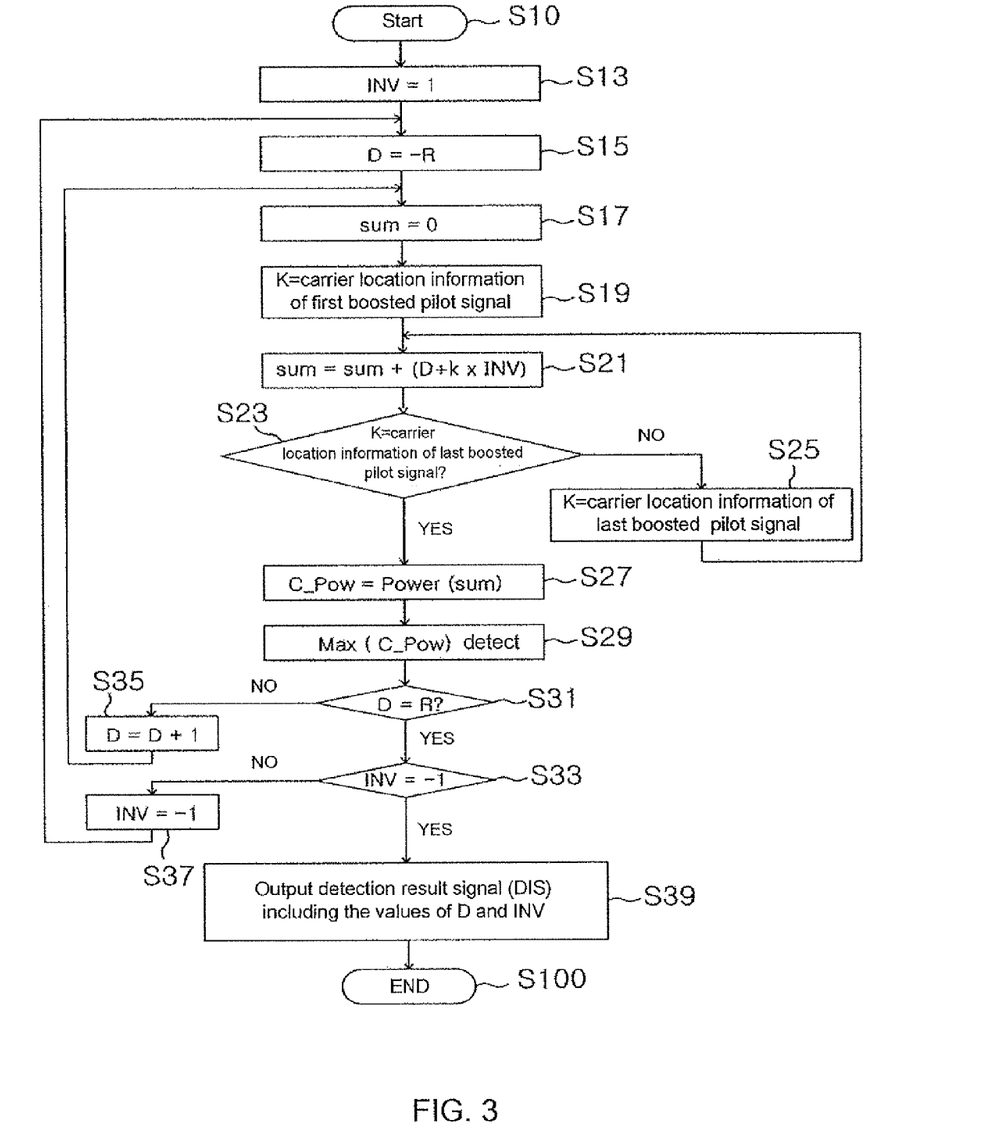
FIG. 3 is a flow chart illustrating a spectrum inversion detection method apparatus according to one preferred embodiment of the present invention.

Then as shown in FIG. 3, at step S15, the controlling portion 42 sets a minimal value within a variation range (−R to R), i.e. the minimum (−R) as an integer frequency offset displacement (D).

When a time-axis symbol is loaded on a carrier and transmitted to the receiver by a transmitter, the frequency of the carrier may lead to a frequency change in actual usage due to a transmission state or an error of the receiver side. Meanwhile, the difference between the frequency in the actual usage and the frequency after the change is a frequency offset; furthermore, when the difference (i.e. changing range) between the frequency in the actual usage and the frequency after the change is an integer multiple, it is referred to as the integer frequency offset.

Meanwhile, the changeable frequency range (−R to R) of the frequency in the actual usage, that is, a variation range of the integer frequency offset has been assigned in accordance with the configuration of the receiver 100, and the variation range of the integer frequency offset is stored in the controlling portion 42.

Figure 5:
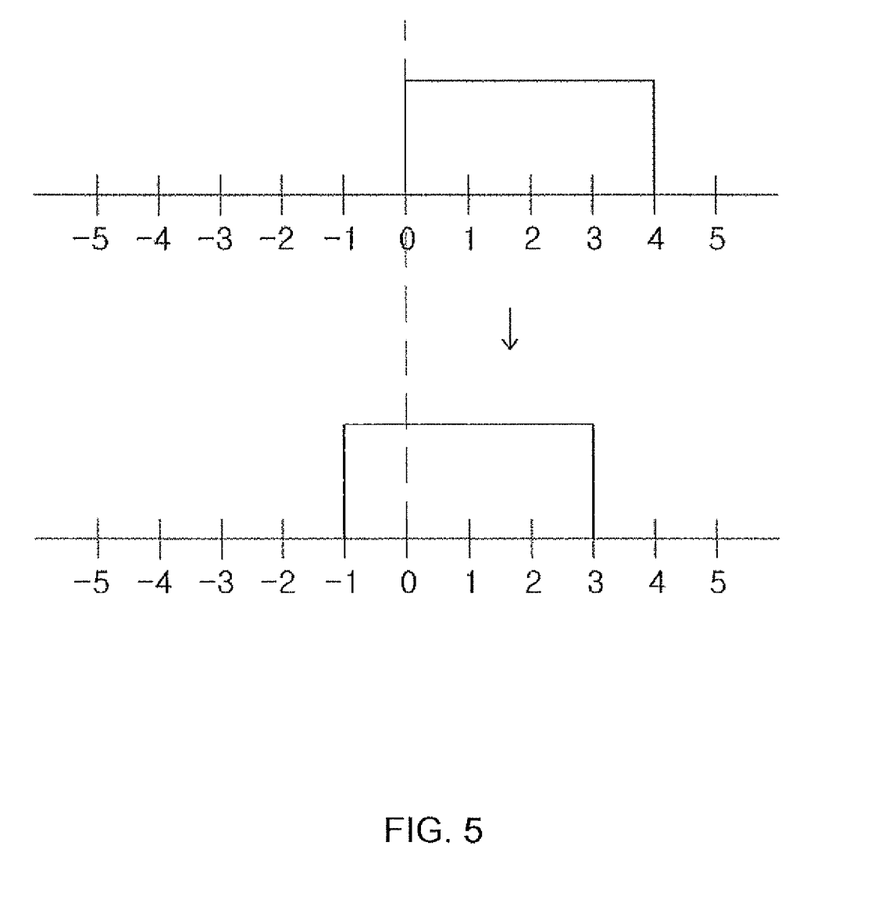
FIG. 5 is a schematic drawing illustrating that an integer frequency offset occurs according to one preferred embodiment of the present invention.

As shown in FIG. 5, for example, when the variation range of the integer frequency offset is −5 to 5, the range of the integer frequency offset becomes −5, −4, −3, −2, −1, 0, 1, 2, 3, 4, and 5 because the changing range becomes the integer multiples. As a result, in this case, the integer frequency offset displacement (D) that has been assigned at step S15 is alternated with the minimum (−R) within the variation range of the integer frequency offset; thus, it is '−5'. The frequency offset occurring in the exemplary FIG. 5 is '−1'.

Second, at step S17, the controlling portion 42 assigns the sum of the differential correlation values of all boosted pilot signals that are included in the corresponding time-axis symbol ($G_n$) to an initialization '0'.

As mentioned above, at step S19, when the spectrum inversion status flag (INV), the integer frequency offset displacement (D), and the initialization of the sum of the differential correlation value [$C_n(k)$] are decided, the controlling portion 42 reads the carrier location information of the first boosted pilot signal in the boosted pilot signals that are included in the received time-axis symbol from the pilot location information storing portion 422, thereby assigning the value of 'k'. Under the condition of the OFDM frame shown in FIG. 4, the carrier location information (k) of the first boosted pilot signal ($CP_0$) at each of the time-axis symbols ($G_0$-$G_{N-1}$), that is, the location information of the carrier having the first boosted pilot signal ($CP_0$) is '0'.

Subsequently, at step S21, in the carrier location information of the register 421, from the differential correlation value [$C_n(0)$~$C_n(M-1)$] corresponding to each carrier of the present time-axis symbol ($G_n$) when (k)=0, the controlling portion 42 reads the differential correlation value [$C_n(0)$] corresponding to the carrier (k=0) which is located at the first boosted pilot signal ($CP_0$), and computes the sum (sum) of the differential correlation value by using an equation according to the read D=−5 (i.e. the integer frequency offset displacement), k=0 (i.e. the carrier at which the first boosted pilot signal is located), and the differential correlation value $C_n(-5+0\ 1)=C_{n-1}[M+(-5+0)]\% \ M=C_{n-1}(M-5)$ of the spectrum inversion status flag (INV). Meanwhile, because the value of the spectrum inversion status flag (INV) is '1', the location information of the first boosted pilot signal ($CP_0$) corresponding to the value of the spectrum inversion status flag (INV) does not change, whereby the differential correlation value applying to the sum (sum) of the previous differential correlation value is [$C_n(M-5)$].

In the following equation 1, the reason for adding the integer frequency offset displacement (D) is that the occurred frequency offset causes the position of the present data out of ideal data position so it required alteration according to the present frequency offset displacement (D) and the differential correlation value is read from the carrier location of the changed pilot signal.

$$\text{sum}=\text{sum}+[C_n(D \pm K\ \text{INV})] \qquad \text{[Equation 1]}$$

Subsequently, at step S23, the controlling portion 42 determines whether the carrier location information K of the present boosted pilot signal is the carrier location information of the last boosted pilot signal of the present time-axis symbol ($G_n$).

At step S25, under the condition that the carrier location information (k) of the determined present boosted pilot signal is not the carrier location information of the last boosted pilot signal, the controlling portion 42 reads the next boosted pilot signal, i.e. the carrier location information of the second boosted pilot signal from the pilot location information storing portion 422, and decides the new value of 'k'.

Under the condition of FIG. 4 (example of an abnormal status D=0), the carrier location information of the last boosted pilot signal ($CP_{M-1}$) is 'M-1', and the carrier location information (k) of the second boosted pilot signal ($CP_3$) is '3'. Here, concerning D=5 and INV=1, the carrier location information (k) of the second boosted pilot signal is −5+3 1=[M+(−5+3)]% M=M−2.

Subsequently, the controlling portion 42 returns to the step S21 for using the carrier location information (K) of the re-assigned second boosted pilot signal to read the differential correlation value [$C_n(M-2)$] of the second boosted pilot signal in the differential correlation values [$C_n(0) \sim C_n(M-1)$] of each carrier in the present time-axis symbol ($G_n$), and then using the equation 1 to compute the sum of the new differential correlation values.

By means of such steps (S21 to S25), the controlling portion 42 utilizes the carrier location information (k) of the first boosted pilot signal to the last boosted pilot signal which are included in the present time-axis symbol ($G_n$), and computes the final differential sum after reading the differential correlation values [$C_n(k)$] of the determined carrier location information (k) read from the register 421.

Accordingly, as the OFDM frame shown in FIG. 4, when the determined boosted pilot signal at the step S23 is the same to the last boosted pilot signal ($CP_{M-1}$) included in the present time-axis symbol ($G_n$), and under the condition that the integer frequency offset displacement (D) is the minimum (−R) (e.g. R=5), the final differential correlation value sum (sum) is sum={$C_n(-5+0\times1)+C_n(-5+3\times1)+C_n(-5+5\times1)+\ldots+C_n(-5+(M-4)\times1)+C_n(-5+(M-1)\times1)+$}={$C_n(M-5)+C_n(M-2)+C_n(0)+\ldots+C_n(M-9)+C_{n-1}(M-6)$}.

Accordingly, at step S27, when the integer frequency offset displacement (D) is the minimum (−R), and the sum of the differential correlation values of the all boosted pilot signals included in the present time-axis symbol ($G_n$) is obtained, the controlling portion 42 squares a real part of the differential correlation value sum (sum) and squares an imaginary part thereof, then adds the both squares of the real part and the imaginary part to compute a correlativity value, and stores the correlativity value (C_Pow) that are represented as real numbers of the correlativity values including the imaginary part.

Subsequently, at step S29, a maximal value among the previous computed correlativity values, i.e. maximal correlativity value [Max(C_Pow)] and the present computed correlativity values (C_Pow) are compared, and a larger correlativity value between the two values is utilized as a new maximum [Max(C_Pow)] to be stored in a storing portion (not shown) of an individual register. Meanwhile, the controlling portion 42 stores the integer frequency offset displacement (D) corresponding to the correlativity value (C_Pow) of the recomputed maximal correlativity value [Max(C_Pow)] and the spectrum inversion status flag (INV) at in the storing portion at the same time.

Finally, when the computed correlativity value (C_Pow) is larger, the correlation between that and the received signal is larger. Therefore, the maximal correlativity value [Max(C_Pow)] is the correlativity value which the correlation between that and the received signal is largest.

Subsequently, at step S31, the controlling portion 42 determines whether the integer frequency offset displacement (D) is the largest value (R) among candidates of the integer frequency offset variation range (range) (−R to R) or not.

Under the condition that the determined integer frequency offset displacement (D) is not the largest value (R), at step S35, the controlling portion 42 adds '1' to the present integer frequency offset displacement (D), and returns to the step S17 for repeating the steps S17 to S31 after is added to the present integer frequency offset displacement (D).

Accordingly, when the integer frequency offset displacement (D) is the minimum plus '1', at step S21, the controlling portion 42 computes the sum (sum) of the differential correlation values corresponding to the all boosted pilot signals in the differential correlation value [$C_n(0) \sim C_n(M-1)$] that are stored in the register 421. At step S27, the controlling portion 42 computes the correlativity value (C_Pow) by the values of the real part and the imaginary part of the final differential correlation value sum (sum). At step S29, after the previous computed maximal correlativity value [Max(C_Pow)] (i.e. the computed maximal correlativity value when the integer frequency offset displacement (D) is the minimum) and the present computed correlativity value (C_Pow) are compared, the larger one is utilized as the new maximal correlativity value [Max(C_Pow)] and stored in the register, and the integer frequency offset displacement (D) corresponding to the maximal correlativity value and the spectrum inversion status flag (INV) are stored in the register.

Finally, on an assumption that the spectrum inversion status flag (INV) is '1', that is, at the state of no spectrum inversion, the controlling portion 42 computes the differential correlation value sum (sum) of the all boosted pilot signals included in the present time-axis symbol ($G_n$) under each displacement of all the displacements within the integer frequency offset variation range (−R to R) for the present time-axis symbol ($G_n$), and after the correlativity value (C_Pow) is thereby computed, the largest value among the computed correlativity values is selected as the maximal correlativity value [Max(C_Pow)]. Accordingly, in accordance with the comparison of the controlling portion 42 at the step S29, the present selected maximum [Max(C_Pow)] is the largest value among the all computed correlativity values.

Subsequently, the controlling portion 42 turns into step S33 for determining whether the value of the spectrum inversion status flag is '−1', and when the value of the spectrum inversion status flag is not '−1', converts the value of the spectrum inversion status flag to '−1', and then turns to the step S15.

Accordingly, on an assumption that the spectrum inversion occurs, after computing the correlativity value (C_Pow) under each displacement of all the displacements within the integer frequency offset variation range (−R to R) for the present time-axis symbol ($G_n$), the controlling portion 42 detects the maximum [Max(C_Pow)] among the all computed correlativity values (C_Pow) through the comparison with the previous maximal correlativity value [Max(C_Pow)], the values of the integer frequency offset displacement (D) and the spectrum inversion status flag (INV) of the computed correlativity value (C_Pow) according to the maximum [Max(C_Pow)], and the detected maximum [Max(C_Pow)] are stored in storing portion at the same time (steps S37 and S15 to S29).

Under the condition that the spectrum inversion status flag (INV) is '−1', when the sum of the differential correlation values is computed by using the equation 1 at the step S21, in accordance with (D+k INV), the carrier location information of the corresponding boosted pilot signal changes according to the value of the spectrum inversion status flag (INV). Meanwhile, under a condition of not considering the integer frequency changing value (D) but just considering (k INV), for example, when K is 5, the desired differential correlation value is $C_n(-5)$, and the differential correlation value [$C_n(-5)$] is the differential correlation value of the carrier corresponding to $C_n(M-5)$.

On the assumption that the spectrum inversion does not occur [i.e. when the value of the spectrum inversion status flag (INV) is '1'] and on the assumption that the spectrum inversion occurs [i.e. when the value of the spectrum inversion status flag (INV) is '−1'], when the maximal correlativity value [Max(C_Pow)] of the correlativity value (C_Pow) under each displacement of all the displacements within the integer frequency offset variation range (−R to R) for the present time-axis symbol ($G_n$), at step S39, the controlling portion 42 reads the values of the integer frequency offset displacement (D) and the spectrum inversion status flag (INV) when maximum [Max(C_Pow)] is detected, and outputs the read results that are utilized as the detection result signal (DIS) to the demodulator 20 at step S41.

Accordingly, the demodulator 20 controls the demodulation of the data applied from the RF module 10 by using the detection result signal (DIS) applied by the spectrum inversion detection apparatus 40 and considering the quantity of the frequency offset and whether the spectrum inversion occurs of the transmitted present time-axis symbol ($G_n$).

Figure 6:
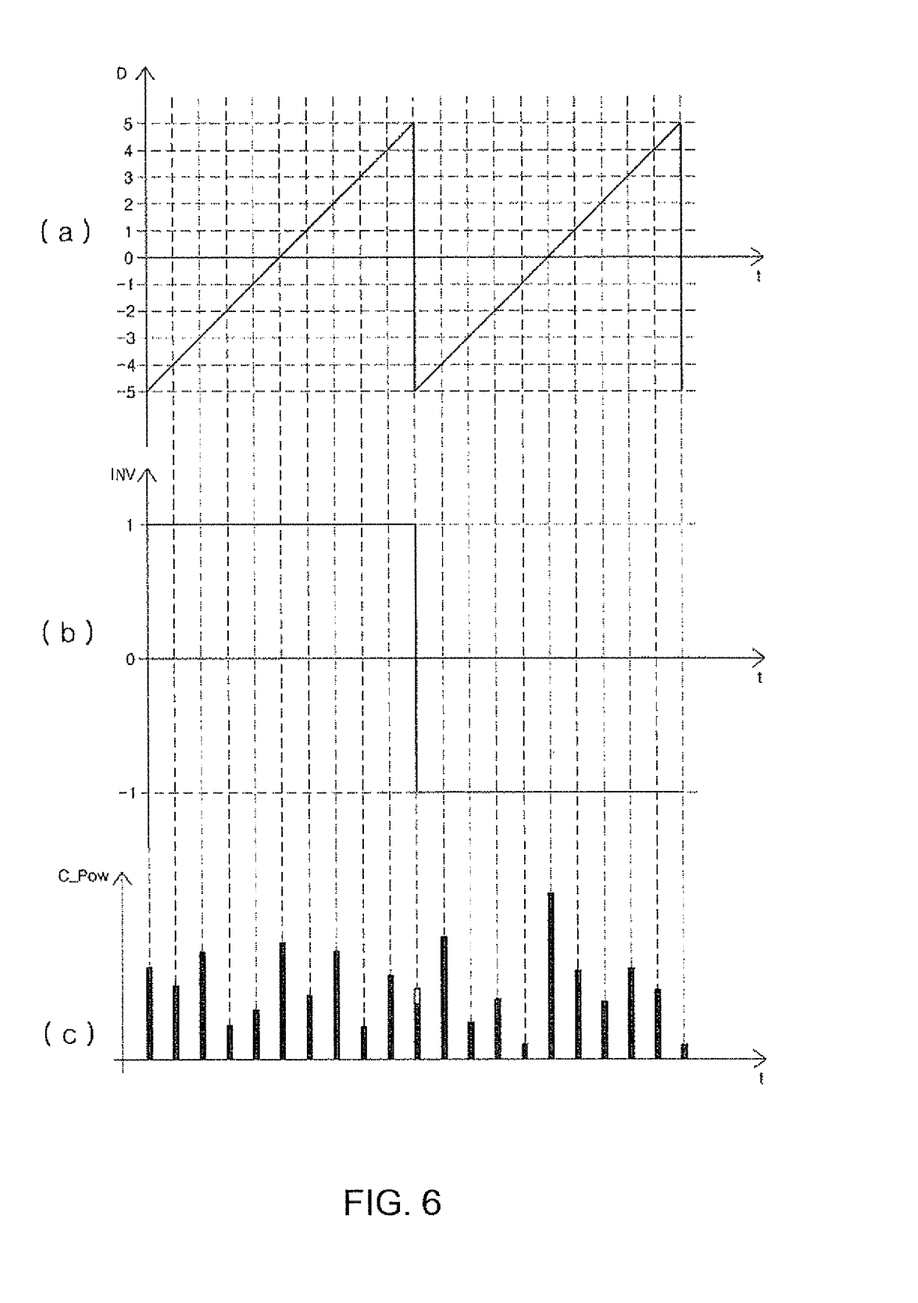

In the drawings of FIG. 6 (a) to (c), the integer frequency offset displacement (D) of the calculated maximal correlativity value (C_Pow) is '0' and the value of the spectrum inversion status flag is '−1' in FIG. 6 (C).

Accordingly, in the case of FIG. 3, the controlling portion 42 outputs the integer frequency offset value of '0' and the spectrum inversion status flag (INV) value of '−1', both of which are utilized as the detection result signal (DIS), to the demodulator 20. The demodulator 20 can understand the states that the frequency offset does not occur and the spectrum inversion occurs by using the detection result signal (DIS).

As mentioned above, under the condition of the embodiment, in determining whether the spectrum inversion occurs, the individual reference signal and PRBS signal are not utilized, but the differential correlation value of the pilot signals is utilized. Thus, the generator for generating the PRBS signal is not required. As a result, under the condition of the embodiment, the structure of the spectrum inversion detection apparatus 40 does not become complex, and the size thereof does not increase, too.

Moreover, in the embodiment, under the condition of using the continual pilot signals, because the carrier location information of the pilot signals for each of the time-axis symbol is the same, there is no need to compute the carrier location information of the pilot signals for every time-axis symbol. Thus, the size or storage capacity of the pilot location information storing portion which is utilized to store the carrier location information of the pilot signals becomes small.

Moreover, in the embodiment, in addition to knowing whether the spectrum inversion occurs or not, the quantity of the frequency offset also can be simultaneously known. Therefore, the individual action for detecting the quantity of the frequency offset is not required, thereby accelerating the processing rate of the receiver. In addition, considering not only whether the spectrum inversion occurs but also the quantity of the frequency offset, the demodulation is realized through the demodulator 20. Therefore, the demodulation of data is more accurately implemented, thereby enhancing the receiving performance of the receiver.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for detecting spectrum inversion, comprising:
a differential correlation value computing portion, after a present time axial symbol having a plurality of carriers is input, utilized to use the present time axial symbol and a previous time axial symbol to compute a plurality of differential correlation values individually corresponding to the carriers; and
a controlling portion, utilized to use the differential correlation values computed by the differential correlation value computing portion, when a spectrum inversion status flag is not at a spectrum inversion state, to compute a sum of the differential correlation values of all pilot signals of the present time axial symbol through each integer frequency displacement within an integer frequency offset variation region, and to compute a correlativity value of the each integer frequency displacement thereby, and when spectrum inversion status flag is at the spectrum inversion state, after computing the sum of the differential correlation values of the all pilot signals of the present time axial symbol through the each integer frequency displacement within the integer frequency offset variation region, and after computing the correlativity value of the each integer frequency displacement thereby, to determine a maximal correlativity value among all the computed correlativity values, and to decide a value of the spectrum inversion status flag of the computed correlativity value which is determined as the maximal correlativity value thereby utilizing as a detection result signal, which is utilized to determine whether it is spectrum inversion or not, to output.

2. The apparatus according to claim 1, wherein the differential correlation value computing portion comprises:
a memory, utilized to store a present data which is utilized as a previous data and to regard the present data as the previous data, and to output a stored data, which is utilized as a previous data, before the storage;
a complex conjugate computing portion, utilized to find a complex conjugate of the previous data output by the memory, thereby output the complex-conjugated previous data; and
a multiplier, utilized to receive the present data and the complex-conjugated previous data, and to compute the differential correlation value of each of the carriers by using the present data and the complex-conjugated previous data.

3. The apparatus according to claim 2, wherein the controlling portion comprises: a register, utilized to store the differential correlation value of each of the carriers output from the multiplier; a pilot location information storing portion, utilized to store carrier location information corresponding to the all pilot signals.

4. The apparatus according to claim 1, wherein the controlling portion determines the integer frequency displacement of the correlativity value which is determined as the maximal correlativity value, thereby utilizing as the detection result signal to be output.

5. The apparatus according to claim 1, the pilot signals are continual pilot signals.

6. A method for detecting spectrum inversion according to the apparatus of claim 1, wherein the sum of the differential correlation values is computed by a following equation: sum=sum+[$C_n$(D+K×INV)] wherein sum is the sum of the differential correlation values, wherein D is a displacement of the integer frequency offset, wherein K is a carrier location information of the pilot signal, wherein INV is a value of the spectrum inversion status flag, and wherein n is a location information of the time axial symbol.

7. The method according to claim 6, wherein the spectrum inversion status flag has the value of either '1' or '−1' the spectrum inversion status flag is indicative of a spectrum non-inversion status when the value of the spectrum inversion status flag is '1', and the spectrum inversion status flag is indicative of a spectrum inversion status when the value of the spectrum inversion status flag is '−1'.

8. A method for detecting spectrum inversion, comprising the steps of:
   setting a spectrum inversion status flag to a spectrum non-inversion status;
   when the spectrum inversion status flag is at the spectrum non-inversion status, reading corresponding differential correlation values of all pilot signals within a present time axial symbol for each integer frequency offset displacement in an integer frequency offset variation region from a register, adding the corresponding differential correlation values of the all pilot signals and thereby assigning a sum of the differential correlation values, squaring a real part of the sum of the differential correlation values and squaring an imaginary part thereof, then adding the squares of the real part and the imaginary part to compute a correlativity value, and determining a maximal correlativity value among all the computed correlativity values;
   setting the spectrum inversion status flag to a spectrum inversion status;
   when the spectrum inversion status flag is at the spectrum inversion status, reading corresponding the differential correlation values of the all pilot signals within the present time axial symbol for the each integer frequency offset displacement in the integer frequency offset variation region from the register, adding the corresponding differential correlation values of the all pilot signals and thereby assigning the sum of the differential correlation values, squaring the real part of the sum of the differential correlation values and squaring the imaginary part thereof, then adding the squares of the real part and the imaginary part to compute the correlativity value, and determining the maximal correlativity value among the all the computed correlativity values; and
   outputting the corresponding integer frequency offset displacement and the spectrum inversion state status flag,
   wherein the maximal correlativity value is a largest correlativity value among the all computed correlativity values when the spectrum inversion status flag is at the spectrum non-inversion status and when the spectrum inversion status flag is at the spectrum inversion status.

9. The method according to claim 8, wherein the sum of the differential correlation values is computed by a following equation: $sum=sum+[C_n(D+K \times INV)]$ wherein sum is the sum of the differential correlation values, wherein D is a displacement of the integer frequency offset, wherein K is a carrier location information of the pilot signal, wherein INV is a value of the spectrum inversion status flag, and wherein n is a location information of the time axial symbol.

10. The method according to claim 9, wherein the spectrum inversion status flag has the value of either '1' or '−1', the spectrum inversion status flag is indicative of the spectrum non-inversion status when the value of the spectrum inversion status flag is '1', and the spectrum inversion status flag is indicative of the spectrum inversion status when the value of the spectrum inversion status flag is '−1'.

11. The method according to claim 8, wherein the pilot signals are continual pilot signals.

\* \* \* \* \*